United States Patent
Agarwal et al.

(10) Patent No.: US 12,408,133 B2
(45) Date of Patent: Sep. 2, 2025

(54) APPARATUS, SYSTEM, AND METHOD OF CLIENT IDENTITY FOR USER EQUIPMENT (UE) SERVICE ACCESS

(71) Applicant: Intel Corporation, Santa Clara, CA (US)

(72) Inventors: Anshu Agarwal, Bangalore (IN); Jay Vishnu Gupta, Bengaluru (IN); Mythili R. Hegde, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 552 days.

(21) Appl. No.: 17/710,785

(22) Filed: Mar. 31, 2022

(65) Prior Publication Data
US 2023/0319753 A1 Oct. 5, 2023

(51) Int. Cl.
*H04W 60/04* (2009.01)
*H04W 4/70* (2018.01)

(52) U.S. Cl.
CPC ............ *H04W 60/04* (2013.01); *H04W 4/70* (2018.02)

(58) Field of Classification Search
CPC ................................ H04W 60/04; H04W 4/70
USPC ........................................................ 370/329
See application file for complete search history.

(56) References Cited

U.S. PATENT DOCUMENTS

| | | | |
|---|---|---|---|
| 10,681,547 B1* | 6/2020 | Yang | H04L 63/0263 |
| 2013/0145449 A1* | 6/2013 | Busser | G06F 21/31 |
| | | | 726/7 |
| 2017/0041856 A1* | 2/2017 | Kim | H04W 4/029 |
| 2022/0007324 A1* | 1/2022 | Gonzalez | H04L 65/1045 |

OTHER PUBLICATIONS

Lightweight Machine to Machine Technical Specification, Approved Version 1.0.2—Feb. 9, 2018, Open Mobile Alliance, OMA-TSLightweightM2M-V1_0_2-20180209-A, 142 pages.

* cited by examiner

*Primary Examiner* — Mark G. Pannell
(74) *Attorney, Agent, or Firm* — Shichrur & Co.

(57) ABSTRACT

For example, a User Equipment (UE) may be configured to generate a client identity element including a user identifier (ID) and a device ID, the user ID based on an identity of a user of the UE, the device ID based on a device identifier of the UE; transmit a registration message from the UE to a device management server to register the UE, the registration message including the client identity element; and transmit a service request to a service provider to initiate access of the UE to a service of the service provider, wherein the service request includes the client identity element.

25 Claims, 8 Drawing Sheets

---

Generate at a User Equipment (UE) a client identity element comprising a user identifier (ID) and a device ID, the user ID based on an identity of a user of the UE, the device ID based on a device identifier of the UE — 702

Transmit a registration message from the UE to a device management server to register the UE, the registration message comprising the client identify element — 704

Transmit a service request to a service provider to initiate access of the UE to a service of the service provider, wherein the service request comprises the client identity element — 706

APPARATUS, SYSTEM, AND METHOD OF CLIENT IDENTITY FOR USER EQUIPMENT (UE) SERVICE ACCESS

TECHNICAL FIELD

Aspects described herein generally relate to client identity for User Equipment (UE) service access.

BACKGROUND

Service providers may require a user of a User Equipment (UE) to register and/or authenticate with the service provider, for example, in order to allow the service provider to provide one or more services to the user.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
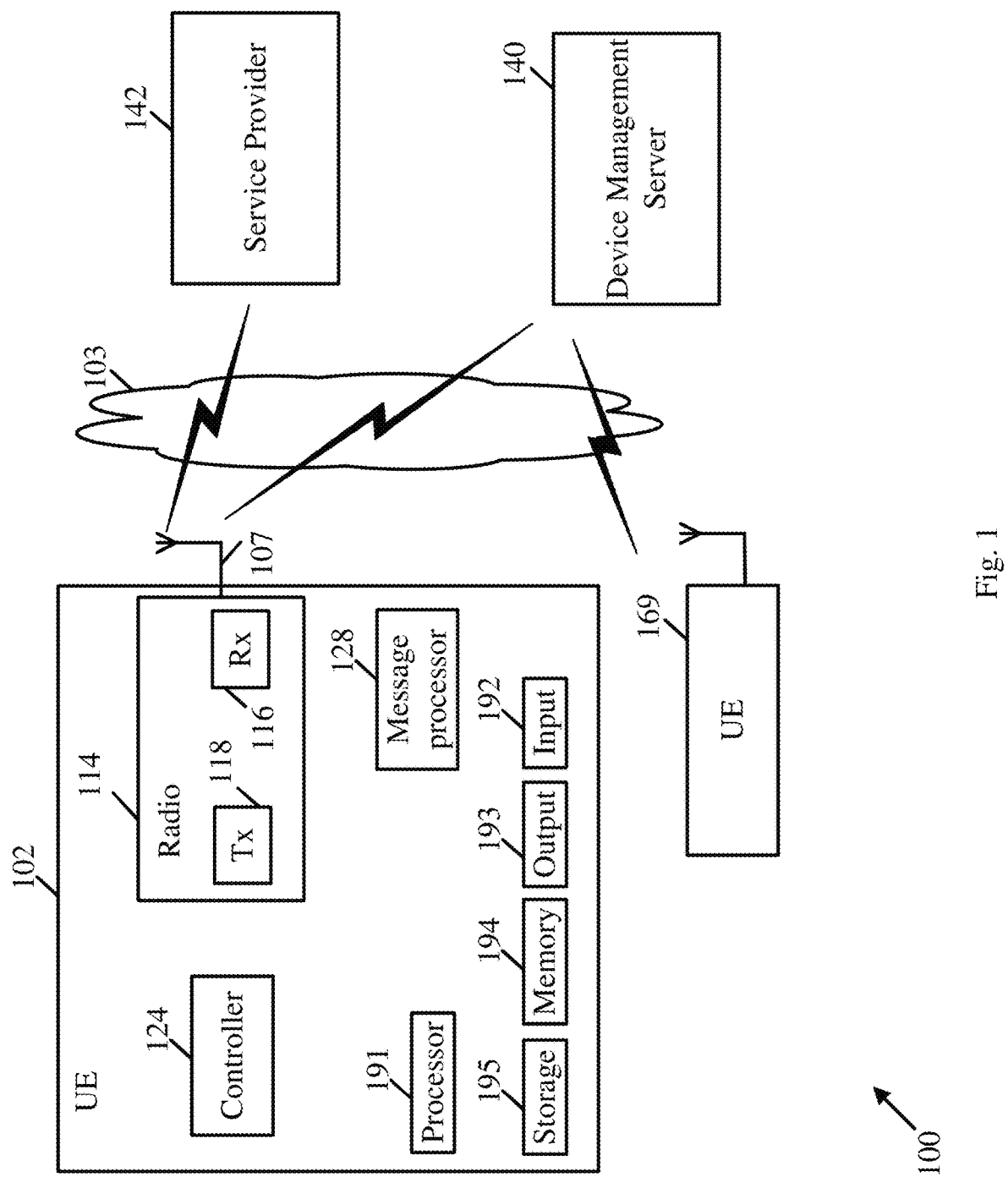
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Bluetooth (BT) device, a Bluetooth Low Energy (BLE) device, an audio device, a video device, an audio (A/V) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Lightweight Machine to Machine (LwM2M) standards (e.g., including *Lightweight Machine to Machine Technical Specification, Approved Version* 1.0.2-9 Feb. 2018, *Open Mobile Alliance OMA-TS-LightweightM2M-V1_0_2-20180209-A*) and/or future versions and/or derivatives thereof, devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements; Part* 11: *Wireless LAN Medium Access Control (MAC) and Physical Layer (PHY) Specifications,* December, 2020)) and/or future versions and/or derivatives thereof, devices and/or networks operating in accordance with existing cellular specifications and/or protocols, units and/or devices which are part of the above networks, and the like.

Some aspects may be used in conjunction with one way and/or two-way radio communication systems, wireless communication systems, cellular radio-telephone communication systems, a mobile phone, a cellular telephone, a wireless telephone, a Bluetooth system, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network, and/or a cellular network, e.g., a 5G network. Other aspects may be used in conjunction with any other suitable wireless communication network, for example, a wireless area network, a "piconet", a WPAN, a WVAN, and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including a UE 102 and/or a UE 169.

In some demonstrative aspects, UE 102 and/or UE 169 may include, for example, a computing device, an MD, a STA, a PC, a desktop computer, a mobile computer, a laptop computer, an Ultrabook™ computer, a Smartphone, a gaming device, a peripheral device, a notebook computer, a tablet computer, a handheld computer, an Internet of Things (IoT) device, a sensor device, a handheld device, a wearable device, an on-board device, an off-board device, a consumer device, a vehicular device, a non-vehicular device, a mobile or portable device, a non-mobile or non-portable device, a mobile phone, a cellular telephone, a video device, an audio device, an A/V device, a video source, an audio source, a video sink, an audio sink, a Personal Media Player (PMP), a digital audio player, a data source, a data sink, a media player, or the like.

In some demonstrative aspects, UE 102 and/or UE 169 may include, operate as, and/or perform the functionality of a client device and/or a client STA. For example, UE 102 may include at least one client device or STA, and/or device 169 may include at least one client device or STA.

In some demonstrative aspects, UE 102 and/or UE 169 may include, operate as, and/or perform the functionality of one or more WLAN STAs.

In some demonstrative aspects, UE 102 and/or UE 169 may include, operate as, and/or perform the functionality of one or more Wi-Fi STAs.

In some demonstrative aspects, UE 102 and/or UE 169 may include, operate as, and/or perform the functionality of one or more cellular client devices.

In other aspects, UE 102 and/or UE 169 may include, operate as, and/or perform the functionality of any other type of client device, STA and/or any other device.

In some demonstrative aspects, UE 102 and/or UE 169 may include, for example, one or more of a processor 191, an input unit 192, an output unit 193, a memory unit 194, and/or a storage unit 195. UE 102 may optionally include other suitable hardware components and/or software components. In some demonstrative aspects, some or all of the components of UE 102 may be enclosed in a common housing or packaging, and may be interconnected or operably associated using one or more wired or wireless links. In other aspects, components of UE 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of UE 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a Solid State Drive (SSD), and/or other suitable removable or non-removable storage units. Memory unit 194 and/or storage unit 195, for example, may store data processed by UE 102.

In some demonstrative aspects, UE 102 and/or UE 169 may be capable of communicating content, data, information and/or signals via a wireless medium (WM) 103.

In some demonstrative aspects, wireless medium 103 may include, for example, a radio channel, a cellular channel, an RF channel, a WiFi channel, a BT channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, UE 102 and/or UE 169 may include one or more radios including circuitry and/or logic to perform wireless communication between UEs 102, 169 and/or one or more other devices. For example, UE 102 may include at least one radio 114.

In some demonstrative aspects, radio 114 may include, for example, a WiFi radio, a cellular radio, a BT radio, and/or the like.

In some demonstrative aspects, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, radio 114 may be configured to communicate over a 2.4 GHz band, a 5 GHz band, a 6 GHz band, a mmWave band, and/or any other band.

In some demonstrative aspects, radio 114 may include, or may be associated with, one or more antennas. For example, radio 114 may include, or may be associated with, one or more antennas 107.

In one example, UE 102 may include a single antenna 107. In another example, UE 102 may include two or more antennas 107.

For example, antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, UE 102 may include a controller 124 configured to perform and/or to trigger, cause, instruct and/or control UE 102 to perform, one or more communications, to generate and/or communicate one or more messages and/or transmissions, and/or to perform one or more functionalities, operations and/or procedures between UEs 102, 169 and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a UE, e.g., UE 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, UE 102 may include a message processor 128 configured to generate, process and/or access one or messages communicated by UE 102.

In one example, message processor 128 may be configured to generate one or more messages to be transmitted by UE 102, and/or message processor 128 may be configured to access and/or to process one or more messages received by UE 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124. In other aspects, the functionality of message processor 128 may be implemented as part of any other element of UE 102.

In some demonstrative aspects, controller 124 may be implemented as part of, and/or may be configured to perform one or more operations and/or functionalities of, a host processor of UE 102.

In some demonstrative aspects, controller 124 may be implemented as part of, and/or may be configured to perform one or more operations and/or functionalities of, an OS of UE 102.

In some demonstrative aspects, at least part of the functionality of controller 124 and/or message processor 128 may be implemented by a host processor of UE 102.

In other aspects, controller 124, and/or message processor 128 may be implemented by one or more additional or alternative elements of UE 102.

In some demonstrative aspects, UE 102 and/or UE 169 may be configured to provide a technical solution to support efficient use of multiple devices by a user, and/or an improved user-experience and/or user-convenience of the user, e.g., as described below.

For example, a user may have multiple smart devices, e.g., a Smartwatch, a Laptop, a Smartphone, a smart-TV, and/or any other user device, which may have various capabilities.

In some demonstrative aspects, in some use cases, scenarios and/or implementations, techniques utilizing a public user identity may have one or more technical issues. For example, an IP Multimedia Subsystem (IMS) architectural framework, e.g., according to a 3GPP Release 6 IMS standard, may be configured to allow users to register the same public user identity from several UEs. However, the IMS architectural framework is specific only to an IMS client, the identity according to the IMS architectural framework is not federated, and the IMS architectural framework cannot support implementation for operator services.

In some demonstrative aspects, in some use cases, scenarios and/or implementations, cloud-based techniques may have one or more technical issues, which may utilize an identifier, which may be tied to a user account of a cloud-based service. For example, these cloud-based techniques are very specific only for account holders of a specific cloud-based service. For example, these cloud-based techniques cannot be used to provide a generic framework for a Single sign-on (SSO) experience on multiple devices, e.g., for using operator services.

In some demonstrative aspects, UE 102 and/or UE 169 may be configured to implement a client-identify mechanism, which may be configured to provide a technical solution to support an improved user-experience and/or enhanced user-convenience, e.g., as described below.

In some demonstrative aspects, UE 102 and/or UE 169 may be configured to implement a client-identify mechanism, which may be configured to provide a technical solution to allow a user of multiple devices, e.g., including UE 102 and/or UE 169, to use a same identity for accessing services via the multiple devices, and/or to allow the user to be reachable via the same identity, for example, even regardless of a number of UEs that user is using simultaneously, e.g., as described below.

In some demonstrative aspects, UE 102 and/or UE 169 may be configured to implement a client-identify mechanism, which may be configured to provide a technical solution to allow a user of multiple devices, e.g., including UE 102 and/or UE 169, to be reachable via the same identity, for example, in a manner which may support and/or ensure seamless and/or hassle-free access across operator services, e.g., as described below.

some demonstrative aspects, UE 102 and/or UE 169 may be configured to implement a client-identify mechanism, which may be configured to provide a technical solution utilizing a common identity for a user, which may be used, for example, across multiple UEs, e.g., including UE 102 and/or UE 169, for example, even without requiring additional user interaction for accessing operator services, e.g., as described below.

In some demonstrative aspects, UE 102 and/or UE 169 may be configured to implement a client-identify mechanism, which may be configured to provide a technical solution to support an SSO-like experience for multiple devices belonging, for example, to a same user, e.g., as described below.

For example, the client-identify mechanism supporting the SSO-like experience may be implemented to provide an improved user experience, for example, by enabling the user to remember and/or manage a reduced number of usernames and/or passwords for use with the devices owned by the user.

For example, the client-identify mechanism may be configured to provide a technical solution to support automatic and/or dynamic provisioning of a unique user identity, for example, for all user devices, for example, in a way which may support an improved level of manageability, scalability, security, and/or convenience, e.g., as described below.

In some demonstrative aspects, UE 102 and/or UE 169 may be configured to implement a client-identify mechanism, which may be configured to provide a technical solution to allow a user of multiple devices, e.g., including UE 102 and/or UE 169, to provide and/or define UE preferences based on service, for example, to define which UE is to be used, for example, on a per-service basis, e.g., as described below.

In some demonstrative aspects, UE 102 and/or UE 169 may be configured to implement a client-identify mechanism, which may be configured to provide a technical solution to allow a user of multiple devices, e.g., including UE 102 and/or UE 169, to provide and/or define UE preferences based on service, e.g., as described below.

In one example, the user may indicate a service-based preference for a given UE, for example, to define which UE is to be used, for example, on a per-service basis, e.g., as described below.

For example, the client-identify mechanism may be implemented to provide a technical solution to support a user of multiple UEs, e.g., a user of UE 102 and UE 159, to define a preference of one or more first services to be used with a first UE, e.g., UE 102, and/or a preference of one or more second services to be used with a second UE, e.g., UE 169.

In some demonstrative aspects, UE 102 and/or UE 169 may be configured to implement a client-identify mechanism, which may be configured in accordance with a Lightweight Machine-to-Machine (LwM2M) protocol, e.g., as described below.

For example, the LwM2M protocol is defined by the Open Mobile Alliance (OMA) for machine-to-machine (M2M) or Internet of Things (IoT) device management and communications.

For example, the LwM2M protocol may be implemented to provide a light and/or compact secure communication interface, for example, along with an efficient data model, which may together enable device management and/or service enablement for M2M devices.

For example, the LwM2M protocol may be utilized as part of a technical solution to implement an Identity Provider in a Federated solution space, for example, to enable users to have unique Identities, e.g., across UEs. The LwM2M protocol may be a good choice for this solution, for example, as the LwM2M protocol is highly encouraged for many IoT device implementations.

In some demonstrative aspects, the LwM2M protocol may be leveraged, for example, as an identity provider for Federated solutions, e.g., as described below. For example, a Bootstrapping interface of the LwM2M protocol may be utilized to support Identity Management, e.g., as described below.

In some demonstrative aspects, UE 102 and/or UE 169 may be configured to implement a client-identify mechanism, which may be configured to utilize, e.g., leverage, the LwM2M protocol as an identity provider supporting a unique user identity, e.g., as described below.

In some demonstrative aspects, UE 102 and/or UE 169 may be configured to implement a client-identify mechanism, which may be configured to support a framework for generating a unique user identity, for example, such that a user may be reached with the same identity, e.g., regardless of a number of devices the user may have. For example, this framework may be implemented to provide a technical solution to ensure seamless and/or hassle-free access across operator services, for example, by leveraging Lightweight Machine-to-Machine techniques and/or any other device management solution as an identity provider, for example, for enabling unique user identity in a Federated Identity Management solution, e.g., as described below.

In some demonstrative aspects, utilizing the LwM2M protocol as an identify provider, e.g., as described below, may provide a technical advantage, for example, since the LwM2M protocol is expected to be widely implemented and/or supported. For example, it is expected that the LwM2M protocol is to be defined as a mandatory Device Management (DM) protocol for IoT devices and/or any other client devices, for example, according to 5G standards and/or any other technology standards.

Some demonstrative aspects are described herein with respect to a client-identify mechanism utilizing operations and/or functionalities of an LwM2M protocol, e.g., as described below.

In other aspects, the client-identify mechanism may be configured to utilize an OMA DM (OMADM) protocol and/or standard.

In other aspects, the client-identify mechanism may be configured to utilize any other additional or alternative DM protocol and/or standard.

In some demonstrative aspects, UE 102 and/or UE 169 may be configured to implement a client-identify mechanism, which may be configured to provide a technical solution to support an SSO-like experience for multiple devices, for example, while implementing operations and/or functionalities of the LwM2M protocol to ensure security, e.g., as described below.

For example, the client-identify mechanism may be configured to support a technical solution to maintain identities by identity federation, for example, using operations and/or functionalities of the LwM2M protocol, e.g., as described below.

In some demonstrative aspects, controller 124 may be configured to control, trigger, instruct and/or cause UE 102 to generate a client identity element corresponding to UE 102, e.g., as described below.

In some demonstrative aspects, the client identity element corresponding to UE 102 may include a user identifier (ID) and a device ID, e.g., as described below.

In some demonstrative aspects, the user ID may be based on an identity of a user of the UE 102, e.g., as described below.

In some demonstrative aspects, the user ID may be based on a unique identifier of the user of UE 102, e.g., as described below.

In some demonstrative aspects, the user ID may be based on biometric information of the user of UE 102, e.g., as described below.

In some demonstrative aspects, the user ID may be based on government-issued ID information of the user of UE 102, e.g., as described below.

In some demonstrative aspects, the user ID may be based on secure biometric information, which is not shared with third parties.

In some demonstrative aspects, the user ID may be based on a username of the user of UE 102.

In some demonstrative aspects, the user ID may be based on a phone number, e.g., a cellular phone number, of the user of UE 102.

In some demonstrative aspects, the user ID may be based on user-based contextual information of the user of UE 102, for example, according to a contextual user profile, e.g., a personalized context profile, of the user of UE 102.

In other aspects, the user ID may be based on any other additional or alternative type of information.

In some demonstrative aspects, the device ID may be based on a device identifier of the UE 102, e.g., as described below.

In some demonstrative aspects, the device ID may be based on an International Mobile Equipment Identity (IMEI) of the UE 102, e.g., as described below.

In other aspects, the user ID may be based on any other additional or alternative type of information to identify the UE 102.

In some demonstrative aspects, controller 124 may be configured to control, trigger, instruct and/or cause UE 102 to generate the user ID in the form of a "Unique User identity", for example, based on biometric information of the user, a government issued unique identity of the user, and/or any other identity information corresponding to the user.

In one example, a data input sensor on UE 102, e.g., input 192, may be utilized, for example, to capture biometric data, e.g., fingerprint data, iris data, face data, or the like. In another example, UE 102 may obtain the biometric data from a suitable government-issued card, e.g., a passport chip.

In some demonstrative aspects, controller 124 may be configured to control, trigger, instruct and/or cause UE 102 to transmit a registration message from the UE 102 to a device management server 140 to register the UE 102, e.g., as described below.

In some demonstrative aspects, the registration message from UE 102 to the device management server 140 may include the client identity element corresponding to UE 102, e.g., as described below.

In some demonstrative aspects, controller 124 may be configured to control, trigger, instruct and/or cause UE 102 to transmit a service request to a service provider 142 to initiate access of the UE 102 to a service of the service provider 142, e.g., as described below.

In some demonstrative aspects, the service request from UE 102 to the service provider 142 may include the client identity element corresponding to UE 102, e.g., as described below.

In some demonstrative aspects, the registration message from UE 102 to the device management server 140 may include a Management Object (MO) including service preference information to indicate a preference criterion for services to connect to the UE 102, e.g., as described below.

In some demonstrative aspects, controller 124 may be configured to control, trigger, instruct and/or cause UE 102 to set in the MO a media type item and a priority item corresponding to the media type item, e.g., as described below.

In some demonstrative aspects, the media type item may be configured to indicate a service media type, e.g., as described below.

In some demonstrative aspects, the priority item may be configured to indicate a priority for a service of the service media type to connect to the UE 102, e.g., as described below.

In some demonstrative aspects, controller 124 may be configured to control, trigger, instruct and/or cause UE 102 to set in the MO a plurality of media type items, for example corresponding to a plurality of service media types, e.g., as described below.

In some demonstrative aspects, controller 124 may be configured to control, trigger, instruct and/or cause UE 102 to set in the MO a plurality of priority items corresponding to the plurality of media type items.

For example, the MO may be configured to include a plurality of item pairs. For example, an item pair may include a media type item configured to indicate a service media type, and a corresponding priority item configured to indicate a priority for a service of the service media type to connect to the UE 102, e.g., as described below.

In one example, the MO may be configured to include a first item pair and a second item pair.

For example, the first item pair may include a first media type item configured to indicate a first service media type, and a corresponding first priority item configured to indicate a first priority for a service of the first service media type to connect to the UE 102.

For example, the second item pair may include a second media type item configured to indicate a second service media type, and a corresponding second priority item configured to indicate a second priority for a service of the second service media type to connect to the UE 102. In one example, the second service media type may be different from the first service media type.

In some demonstrative aspects, controller 124 may be configured to control, trigger, instruct and/or cause UE 102 to set the media type item to a selected media type value from a list of predefined media type values corresponding to a plurality of predefined service media types, e.g., as described below.

In some demonstrative aspects, the list of predefined media type values may include, for example, a first predefined media type value, e.g., 0 or any other value, corresponding to a first predefined service media type, e.g., voice; a second predefined media type value, e.g., 1 or any other value, corresponding to a second predefined service media type, e.g., video; a third predefined media type value, e.g., 2 or any other value, corresponding to a second predefined service media type, e.g., games; and/or a fourth predefined media type value, e.g., 3 or any other value, corresponding to a fourth predefined service media type, e.g., games.

In other aspects, the list of predefined media type values may include any other additional or alternative predefined media type values corresponding to any other additional or alternative predefined service media types.

In some demonstrative aspects, controller 124 may be configured to control, trigger, instruct and/or cause UE 102 to set the priority item to a selected priority value from a predefined range of priority values, e.g., as described below.

In some demonstrative aspects, the predefined range of priority values may include, for example, 256 range values, e.g., between 0 and 255. For example, a first value of the predefined range of priority values, e.g., 0, may represent a high priority and/or preference; and/or a second value of the predefined range of priority values, e.g., 255, may represent a low priority and/or preference.

In other aspects, the predefined range of priority values may include any other range of values.

In other aspects, the media type item and/or the priority item may be configured according to any other configuration and/or definition.

In some demonstrative aspects, the media type item and/or the priority item may be included as part of a predefined MO having a predefined object ID, e.g., according to the LwM2M protocol and/or any other protocol, e.g., as described below.

In some demonstrative aspects, controller 124 may be configured to control, trigger, instruct and/or cause UE 102 to set an object ID in the MO to 10242, e.g., as described below.

In other aspects, any other predefined MO having any other predefined object ID may be utilized to carry the media type item and/or the priority item.

In some demonstrative aspects, the media type item and/or the priority item may be included as part of a new and/or extended MO configuration, e.g., as described below.

In some demonstrative aspects, controller 124 may be configured to control, trigger, instruct and/or cause UE 102 to set an External-device-info item in the registration message to direct to the MO, which includes the media type item and/or the priority item, e.g., as described below.

In some demonstrative aspects, controller 124 may be configured to control, trigger, instruct and/or cause UE 102 to set the preference information based on information from the user of the UE 102, e.g., as described below.

For example, controller 124 may be configured to control, trigger, instruct and/or cause UE 102 to process information received from the user of UE 102, e.g., via input 192, and to set the preference information based on the information received from the user of UE 102.

In some demonstrative aspects, controller 124 may be configured to control, trigger, instruct and/or cause UE 102 to process traffic received from one or more service providers, e.g., from service provider 142, for example, according to the preference criterion, e.g., as described below.

For example, the user of UE 102 and/or UE 169 may input to UE 102 information defining that service providers of a first type, e.g., video services, are to connect to the UE 102 for providing services of the first type to the user, and/or that service providers of a second type, e.g., gaming services, are to connect to the UE 169 for providing services of the second type to the user. According to this example, controller 124 may be configured to control, trigger, instruct and/or cause UE 102 to process traffic received from one or more service providers of the first service type, e.g., service provider 142.

In some demonstrative aspects, controller 124 may be configured to control, trigger, instruct and/or cause UE 102 to set an Endpoint Client Name parameter including the client identity element in the registration message, e.g., as described below.

In some demonstrative aspects, controller 124 may be configured to control, trigger, instruct and/or cause UE 102 to transmit the registration message from the UE 102 to a device management server, e.g., the device management server 140, which may include an LwM2M server, e.g., as described below.

In some demonstrative aspects, the registration message may include, for example, a registration request according to an LwM2M protocol, e.g., as described below.

In some demonstrative aspects, controller 124 may be configured to control, trigger, instruct and/or cause UE 102 to establish access to the service provided by service provider 142, for example, based on an exchange of messages with the device management server 140 and with the service provider 142, e.g., as described below.

In some demonstrative aspects, the exchange of messages of UE 102 with the device management server 140 and with the service provider 142 may be configured, for example, according to a Federated Identity Management (FIdM) procedure, e.g., as described below.

In some demonstrative aspects, the exchange of messages of UE 102 with the device management server 140 and with the service provider 142 may be configured, for example, according to an FIdM procedure using the LwM2M server, e.g., the server 142, as an identify provider server, e.g., as described below.

In some demonstrative aspects, controller 124 may be configured to control, trigger, instruct and/or cause UE 102 to process credential information corresponding to the UE 102, which may be received, for example, from the device management server 140, e.g., as described below.

In some demonstrative aspects, controller 124 may be configured to control, trigger, instruct and/or cause UE 102 to transmit an authentication request to the device management server 140, for example, based on an authentication request from the service provider 142, e.g., as described below.

In some demonstrative aspects, controller 124 may be configured to control, trigger, instruct and/or cause UE 102 to transmit an authentication request to the device management server 140, for example, to authenticate the UE 102 for accessing the service of the service provider 142, e.g., as described below.

In some demonstrative aspects, the authentication request may include the credential information corresponding to the UE 102, for example, as received from the device management server 140, e.g., as described below.

In some demonstrative aspects, UE 102, UE 169, device management server 140 and/or service provider 142 may be configured to perform one or more operations and/or functionalities according to a mechanism, e.g., an FIdM mechanism, which may support multiple Service Providers (SPs) to allow users to use the same identification data, for example, to obtain access to different networks of resource owners and/or services in multiple domains.

For example, the FIdM mechanism may be utilized to support a technical solution to allow a user access to protected resources and/or services, for example, while the SP facilities an identification, authentication and/or authorization process, which may be handled by a third party, for example, an Identity Provider (IdP).

For example, the IdP may create, maintain, and/or manage identity information for users, for example, while providing authentication services to applications within a distributed network. For example, the IdP may be responsible for reviewing and/or authenticating user credentials, e.g., instead of the SPs themselves.

For example, when a user requests a service from an SP, the SP may communicate with the IdP, e.g., to authenticate the user.

In one example, this procedure for user identity authorization may be executed through an open sourced Security Assertion Markup Language (SAML), an OAuth protocol, an OpenID Connect protocol, and/or any other suitable protocol and/or standard.

In some demonstrative aspects, UE 102 and/or UE 169 may be configured to utilize the client identity element corresponding to UE 102, e.g., including the user ID and the device ID, for example, to utilize identity federation to allow the user of UE 102 and/or UE 169 to access operator services on various UEs, e.g., seamlessly. For example, the user of, UE 102 and/or UE 169 may be issued with a secure biometric-based identity, which is not shared with third parties, and may be used with identity federation, for example, to allow access to the operator services.

In some demonstrative aspects, device management server 140 may be configured to utilize an LwM2M protocol as an identity provider, for example, to manage an identification, authentication and/or authorization process for UE 102 and/or UE 169.

In some demonstrative aspects, implementing the LwM2M protocol as the identity provider may provide a technical advantage, for example, in deployments where a device management server, e.g., device management server 140, is hosted in an operator network, for example, in case operators mandate all IoT devices to implement LwM2M.

In some demonstrative aspects, for example, the LwM2M protocol may be utilized as a framework where user identity may be provided to a server, e.g., device management server 140, which is hosted in the operator network. In one example, this functionality may be provided via bootstrapping.

Figure 2:
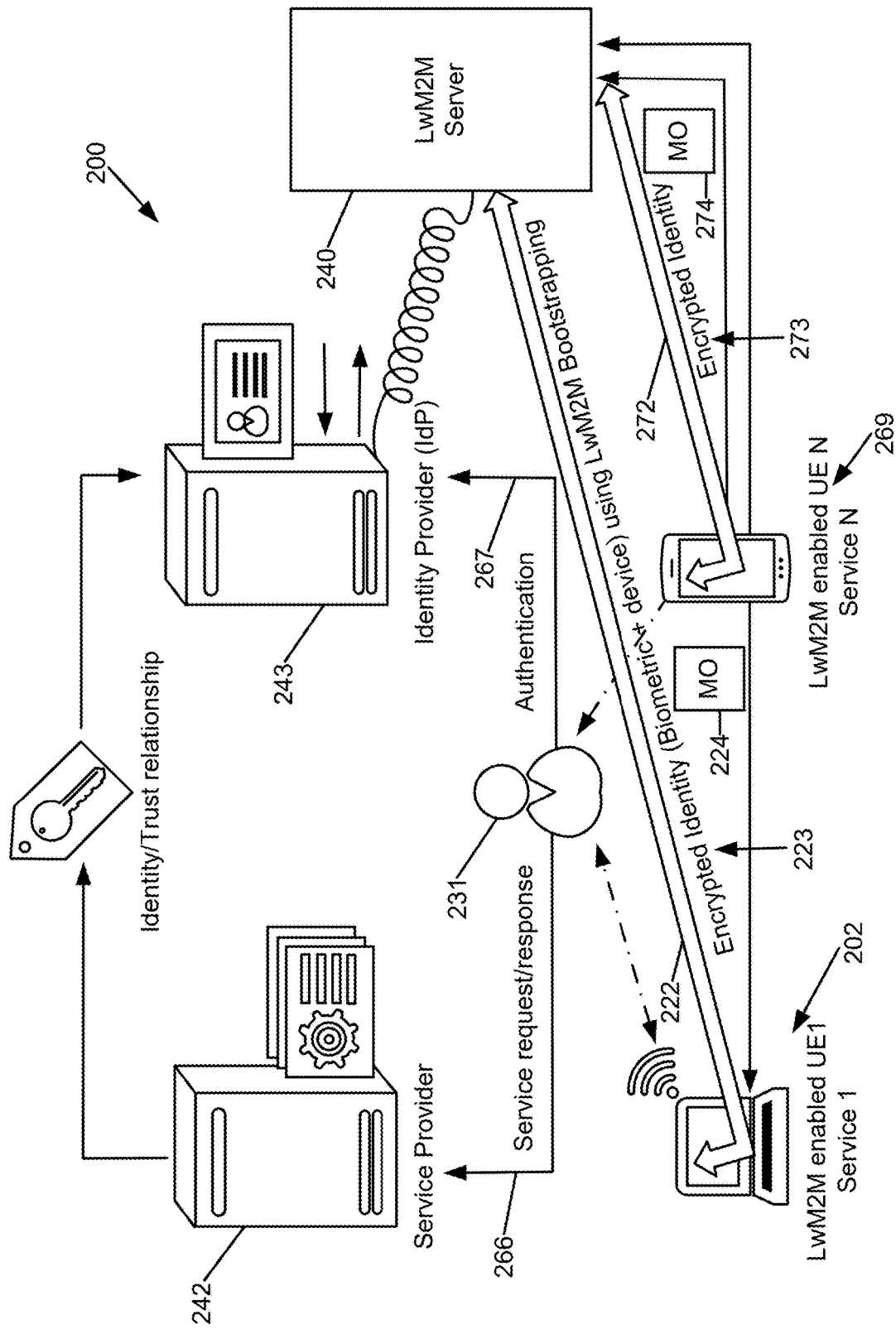
FIG. 2 is a schematic illustration of operations and communications of a plurality of User Equipment (UEs) with a device management server and a service provider, in accordance with some demonstrative aspects.

Reference is made to FIG. 2, which schematically illustrates operations and communications of a plurality of UEs with a device management server 240 and a service provider 242, in accordance with some demonstrative aspects.

In some demonstrative aspects, as shown in FIG. 2, a user 231 may have a plurality of UEs, for example, N UEs, e.g., including a UE 202 and/or a UE 269.

For example, UE 102 (FIG. 1) may include, and/or be configured to perform one or more operations of, and/or functionalities of, UE 202; and/or UE 169 (FIG. 1) may include, and/or be configured to perform one or more operations of, and/or functionalities of, UE 269.

In some demonstrative aspects, UE 202 may be configured to generate a client identity element 223 corresponding to the user 231 and to the UE 202.

In some demonstrative aspects, for example, the client identity element 223 may include a user ID corresponding to the user 231, and a device ID corresponding to the UE 202.

In some demonstrative aspects, UE 202 may be configured to generate the client identity element 223, for example, based on a unique identity for the user 231, for example, along with the device identity corresponding to the UE 202.

In some demonstrative aspects, UE 269 may be configured to generate a client identity element 273 corresponding to the user 231 and to the UE 269.

In some demonstrative aspects, for example, the client identity element 273 may include a user ID corresponding to the user 231, and a device ID corresponding to the UE 269.

In some demonstrative aspects, UE 269 may be configured to generate the client identity element 273, for example, based on a unique identity for the user 231, for example, along with the device identity corresponding to the UE 269.

In some demonstrative aspects, the client identity element 273 generated by UE 269 and the client identity element 223 generated by UE 202 may include the same user ID corresponding to the user 231.

In some demonstrative aspects, the same user ID corresponding to the user 231 may be used for generating client identity elements for all user owned devices, which are owned by the user 231, e.g., for all UEs owned by the user 231.

In some demonstrative aspects, the user ID corresponding to the user 231 may be a unique user ID, which may be unique to the user 231, for example, with respect to any other user IDs of any other users of a system.

In some demonstrative aspects, the user ID corresponding to the user 231 may be based on an identity of user 231.

In some demonstrative aspects, the user ID corresponding to the user 231 may be based on a unique identifier of the user 231.

In some demonstrative aspects, the user ID corresponding to the user 231 may be based on biometric information of the user 231.

In some demonstrative aspects, the user ID corresponding to the user 231 may be based on government-issued ID information of the user 231.

In some demonstrative aspects, the device ID corresponding to the UE 269, which may be used for generating client identity element 273 may be different, for example, from the device ID corresponding to the UE 202, which may be used for generating client identity element 223.

In some demonstrative aspects, the device ID corresponding to the UE 202, which may be used for generating client identity element 223 may be specific to UE 202 and/or unique to UE 202.

In some demonstrative aspects, the device ID corresponding to the UE 202, which may be used for generating client identity element 223 may include and/or may be based on, for example, an IMEI of UE 202, a Mobile Equipment Identifier (MEID) of UE 202, a UE ID corresponding to UE 202, and/or any other device ID corresponding to UE 202.

In some demonstrative aspects, the device ID corresponding to the UE 202 may be included as part of the client identity element 223, for example, to provide a technical solution for one or more service providers, e.g., a service provider 242, to redirect one or more services to the UE 202, for example, based on a user preference of user 231, e.g., as described below.

In some demonstrative aspects, the device ID corresponding to the UE 269, which may be used for generating client identity element 273 may be specific to UE 269 and/or unique to UE 269.

In some demonstrative aspects, the device ID corresponding to the UE 269, which may be used for generating client identity element 273 may include and/or may be based on, for example, an IMEI of UE 269, an MEID of UE 269, a UE ID corresponding to UE 269, and/or any other device ID corresponding to UE 269.

In some demonstrative aspects, the device ID corresponding to the UE 269 may be included as part of the client identity element 273, for example, to provide a technical solution for one or more service providers, e.g., a service provider 242, to redirect one or more services to the UE 269, for example, based on a user preference of user 231, e.g., as described below.

In some demonstrative aspects, as shown in FIG. 2, the client identity elements corresponding to the UEs of user 231, e.g., including the client identity element 223 corresponding to UE 202 and/or the client identity element 273 corresponding to UE 269, may be utilized as part of a federated unique identity technical solution on multiple UE's, for example, using an LwM2M protocol, e.g., as described below.

In some demonstrative aspects, UE 202 may be configured to transmit a message 222 including the client identity element 223 corresponding to UE 202 to a device management server 240. For example the message 222 may include a registration message to register the UE 202 at device management server 240.

In some demonstrative aspects, UE 269 may be configured to transmit a message 272 including the client identity element 273 corresponding to UE 269 to the device management server 240. For example the message 272 may include a registration message to register the UE 269 at device management server 240.

In some demonstrative aspects, as shown in FIG. 2, the device management server 240 may include an LwM2M server. For example, the message 222 and/or the message 272 may include a registration request according to an LwM2M protocol, e.g., as described below.

In other aspects, the device management server 240 may include any other type of device management server, and/or the messages 222 and/or 272 may include any other type of message according to any other suitable protocol.

In some demonstrative aspects, the LwM2M protocol may be utilized, for example, for provisioning credentials on UE 202 and/or UE 269. For example, the credentials provisioned on UE 202 and/or the credentials provisioned on UE 260 may be used, for example, for accessing one or more services of the service provider 242. For example, the credentials for UE 202 may be provisioned on UE 202 and/or the credentials for UE 269 may be provisioned on UE 260 using a bootstrapping interface, e.g., LwM2M bootstrapping.

In some demonstrative aspects, as shown in FIG. 2, the device management server 240 may be configured to serve as an Identity Provider (IP) 243. For example, the LwM2M server 240 may maintain the identity of users, e.g., the identities of the UEs of user 231. For example, the LwM2M server 240 may serve as the IP 243, for example, to enable a unique user identity mechanism.

For example, the LwM2M server 240 may utilize an Authorization for Constrained Environments (ACE) Open Authorization (Oath) (ACE-Oath) mechanism and/or any other suitable mechanism or protocol, to support the unique user identity mechanism. In one example, the ACE-OAuth mechanism may be implemented to augment a device management solution, e.g., LwM2M, for example, to provide a technical solution supporting Cross Domain identity Management and/or flexible use of user authentication technologies.

For example, an FIdM mechanism may be utilized to provide a technical solution for a single identity to be used by user 232, for example, across multiple UEs/websites/services, for example, rather than requiring the user 231 to register and remember credentials for each UE/service.

For example, the FIdM mechanism may be utilized to provide a technical solution for users to request services from SPs, e.g., SP 242, and/or to access resources from a network.

In one example, the FIdM mechanism may be utilized for 5G communications in a 5G communication network, for example to enable users, e.g., user 231, to seamlessly access operator services from 5G communications.

In some demonstrative aspects, the user 231 may use a UE, e.g., UE 202, to access a service provided by service provider 242, e.g., as described below.

In some demonstrative aspects, UE 202 may be configured to establish access to the service provided by service provider 240, for example, based on an exchange of messages with the device management server 240 and with the service provider 242, e.g., as described below.

In some demonstrative aspects, the exchange of messages of UE 202 with the device management server 240 and with the service provider 242 may be configured, for example, according to an FIdM procedure, e.g., as described below.

In some demonstrative aspects, UE 202 may be configured to exchange with the service provider 242 one or more messages 266, for example, to initiate access of the UE 202 to the service of the service provider 242.

In some demonstrative aspects, the one or more messages 266 may include a service request from the UE 202 to the service provider 242. For example, the service request may include the client identity element corresponding to UE 202, e.g., the client identity element 222.

In some demonstrative aspects, as shown in FIG. 2, the UE 202 may exchange one or more authentication messages 267 with the identity provider 243, e.g., as implemented by the LwM2M server 240, for example to authenticate the user 231.

In some demonstrative aspects, as shown in FIG. 2, the service provider 242 may provide the UE 202 with access to the service, for example, based on an identity/trust relationship between the service provider 242 and the identity provider 243, for example, based on authentication of the user 231 by the identity provider 243.

In some demonstrative aspects, UE 202 and/or UE 269 may be configured to provide to the device management server 240 service preference information to indicate a preference criterion for services to connect to the UE 202 and/or UE 269, e.g., as described below.

In some demonstrative aspects, UE 202 may be configured to provide to the device management server 240 service preference information to indicate a preference criterion for services to connect to the UE 202; and/or UE 269 may be configured to provide to the device management server 240 service preference information to indicate a preference criterion for services to connect to the UE 269.

In some demonstrative aspects, the service preference information for a UE may be provided to the device management server 240, for example, as part of the registration process of the UE, e.g., as described below.

In some demonstrative aspects, the service preference information for the UE may be provided to the device management server 240, for example, as part of a registration request from the UE to the device management server 240, e.g., as described below.

In some demonstrative aspects, the registration request from the UE to the device management server 240 may be configured to include an MO including the service preference information for the UE, e.g., as described below.

In some demonstrative aspects, as shown in FIG. 2, UE 202 may be configured to send to the device management server 240 an MO 224 including the service preference information for the UE 202, e.g., as described below.

In some demonstrative aspects, the preference information in MO 224 may be configured to indicate a preference criterion for services to connect to the UE 202, e.g., as described below.

In some demonstrative aspects, UE 202 may be configured to set the preference information in MO 224, for example, based on information from the user 231, e.g., regarding which services are preferred by the user 231 for connecting to the UE 202.

In some demonstrative aspects, the MO 224 may be included as part of the message 222, e.g., together with the client identity element 223, e.g., as described below.

In other aspects, the MO 224 may be sent to the device management server 240 in any other message, e.g., separate from the message 222 and/or the client identity element 223.

In some demonstrative aspects, as shown in FIG. 2, UE 269 may be configured to send to the device management server 240 an MO 274 including the service preference information for the UE 269, e.g., as described below.

In some demonstrative aspects, the preference information in MO 274 may be configured to indicate a preference criterion for services to connect to the UE 269, e.g., as described below.

In some demonstrative aspects, UE 269 may be configured to set the preference information in MO 274, for example, based on information from the user 231, e.g., regarding which services are preferred by the user 231 for connecting to the UE 269.

In some demonstrative aspects, the MO 274 may be included as part of the message 272, e.g., together with the client identity element 273, e.g., as described below.

In other aspects, the MO 274 may be sent to the device management server 240 in any other message, e.g., separate from the message 272 and/or the client identity element 273.

In some demonstrative aspects, the MO 224 and/or the MO 274 may be utilized, for example, to provide a technical solution for an SP, e.g., the service provider 242, to be able to select which UE of user 231, e.g., UE 202 or UE 269, to reach, for example, for providing mobile terminated services.

For example, the MO 224 and/or the MO 274 may be utilized, for example, to provide a technical solution for the SP, e.g., the service provider 242, to select which UE of user 231, e.g., UE 202 or UE 269, to reach for providing the mobile terminated services, for example, based on the preference set by UEs 202 and/or 269.

For example, the MO 224 and/or the MO 274 may be utilized, for example, to provide a technical solution for the user 231 to give preference of services that the user 231 would like to utilize in the UEs of user 231, e.g., UE 202 and/or UE 269.

In some demonstrative aspects, for example, the service provider 242 may utilize the preference information corresponding to the UEs belonging to user 231, for example, to decide which UE to reach for a service to be provided to the user 231.

For example, user 231 may input to UE 202 information defining that service providers of a first type, e.g., voice services, are to connect to the UE 202 for providing services of the first type to the user 231. According to this example, the UE 202 may configure the MO 224 to include preference information indicating a preference for service providers of the first type, e.g., voice services. For example, the device management server 240 may register the UE 202, e.g., according to the client identity element 223, and may store the preference information indicating the preference of the UE 202 for service providers of the first type, e.g., voice services.

For example, user 231 may input to UE 269 information defining that service providers of a second type, e.g., game services, are to connect to the UE 269 for providing services of the second type to the user 231. According to this example, the UE 269 may configure the MO 274 to include preference information indicating a preference for service providers of the second type, e.g., game services. For example, the device management server 240 may register the UE 269, e.g., according to the client identity element 273, and may store the preference information indicating the preference of the UE 269 for service providers of the second type, e.g., game services.

For example, a first service provider 242 to provide a service of the first type to user 231, e.g., a voice service, may be able to receive, e.g., from the device management server 240 the preference information corresponding to the UE 202 and/or the preference information corresponding to UE 269.

For example, the first service provider 242 may select to connect to the UE 202 for providing the service of the first type to user 231, for example, based on the preference information indicating the preference of the UE 202 for service providers of the first type.

For example, a second service provider 242 to provide a service of the second type to user 231, e.g., a game service, may be able to receive, e.g., from the device management server 240 the preference information corresponding to the UE 202 and/or the preference information corresponding to UE 269.

For example, the second service provider 242 may select to connect to the UE 269 for providing the service of the second type to user 231, for example, based on the preference information indicating the preference of the UE 269 for service providers of the second type.

In some demonstrative aspects, MO 224 and/or MO 274 may be configured to include a predefined MO having a predefined object ID, e.g., according to the LwM2M protocol and/or any other protocol, e.g., as described below.

In some demonstrative aspects, MO 224 and/or MO 274 may be configured to include an object ID set to 10242.

In other aspects, MO 224 and/or MO 274 may be implemented using any other predefined MO having any other predefined object ID.

In some demonstrative aspects, MO 224 and/or MO 274 may be configured to include a new and/or extended MO configuration.

In some demonstrative aspects, MO 224 and/or MO 274 may be configured as an Extended (Ext) MO, for example, according to the LwM2M protocol.

In other aspects, MO 224 and/or MO 274 may include any other MO configuration.

Figure 3:
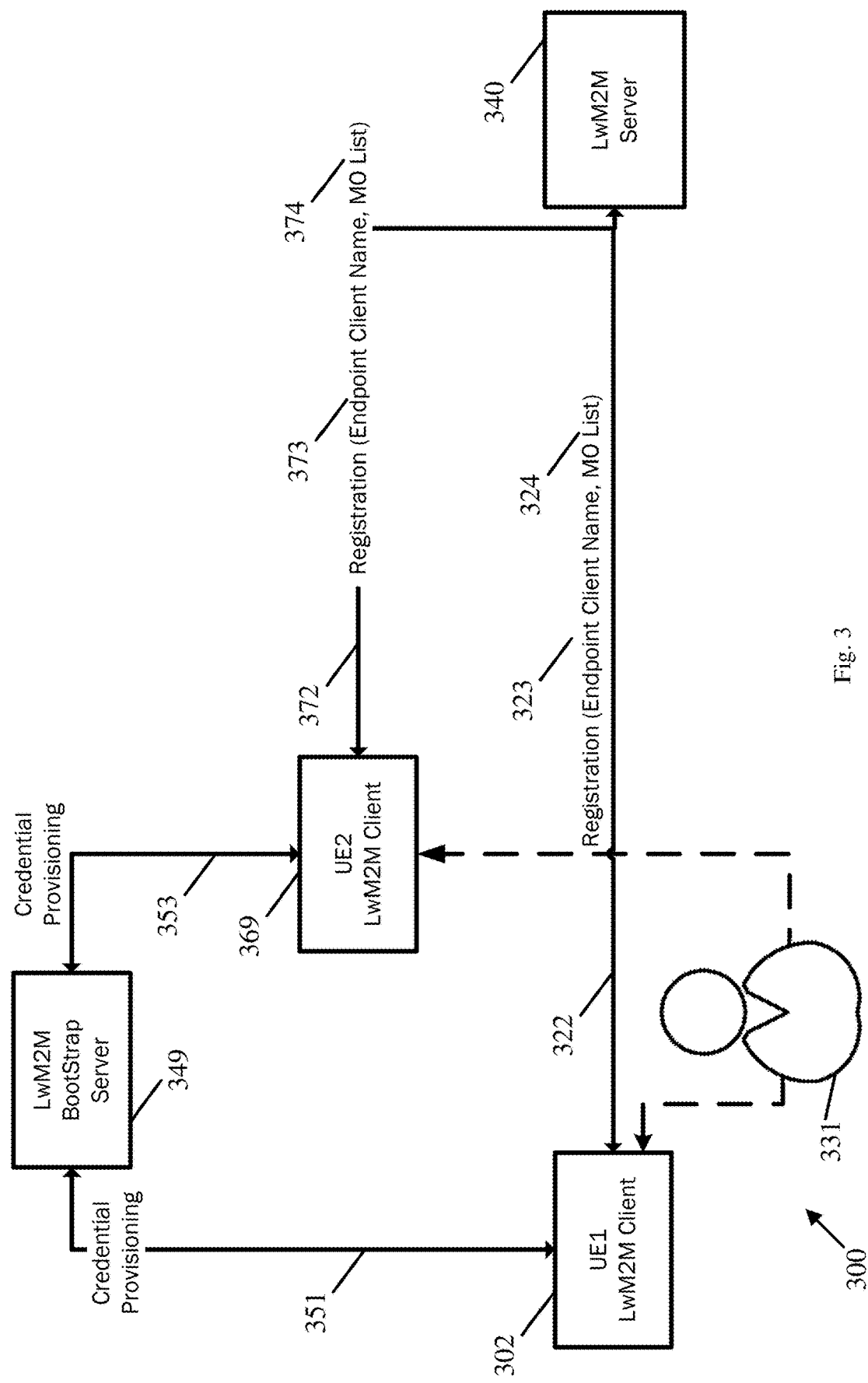
FIG. 3 is a schematic illustration of operations and communications of a Light-Weight Machine-to-Machine (LwM2M) registration procedure, which may be implemented in accordance with some demonstrative aspects.

Reference is made to FIG. 3, which schematically illustrates FIG. 3 operations and communications of an LwM2M registration procedure 300, which may be implemented in accordance with some demonstrative aspects.

In some demonstrative aspects, as shown in FIG. 3, a user 331 may have a plurality of UEs, for example, N UEs, e.g., including a UE 302 and/or a UE 369.

For example, UE 102 (FIG. 1) may include, and/or be configured to perform one or more operations of, and/or functionalities of, UE 302; and/or UE 169 (FIG. 1) may include, and/or be configured to perform one or more operations of, and/or functionalities of, UE 369.

In some demonstrative aspects, as shown in FIG. 3, UE 302 may include, and/or be configured to perform one or more operations of, and/or functionalities of, a first LwM2M client device; and/or UE 369 may include, and/or be configured to perform one or more operations of, and/or functionalities of, a second LwM2M client device.

In some demonstrative aspects, UE 302 may be configured to generate a client identity element 323 corresponding to the user 331 and to the UE 302.

In some demonstrative aspects, for example, the client identity element 323 may include a user ID corresponding to the user 331, and a device ID corresponding to the UE 302, e.g., as described above.

In some demonstrative aspects, UE 369 may be configured to generate a client identity element 373 corresponding to the user 331 and to the UE 369.

In some demonstrative aspects, for example, the client identity element 373 may include a user ID corresponding to the user 331, and a device ID corresponding to the UE 369, e.g., as described above.

In some demonstrative aspects, as shown in FIG. 3, the client identity elements corresponding to the UEs of user 331, e.g., including the client identity element 323 corresponding to UE 302 and/or the client identity element 373 corresponding to UE 369, may be utilized as part of a federated unique identity technical solution on multiple UE's, for example, using an LwM2M protocol, e.g., as described below.

In some demonstrative aspects, UE 302 may be configured to transmit an LwM2M registration message 322 including the client identity element 323 corresponding to UE 302 to an LwM2M server 340.

In some demonstrative aspects, UE 369 may be configured to transmit an LwM2M registration message 372 including the client identity element 373 corresponding to UE 369 to the LwM2M server 340.

In some demonstrative aspects, as shown in FIG. 3, UE 302 may be configured to send to the LwM2M server 340 an MO list 324 including one or more MOs representing service preference information for the UE 302.

In some demonstrative aspects, the preference information in MO list 324 may be configured to indicate a preference criterion for services to connect to the UE 302, e.g., as described above.

In some demonstrative aspects, as shown in FIG. 3, the MO list 324 may be included as part of the registration message 322, e.g., together with the client identity element 323.

In some demonstrative aspects, as shown in FIG. 3, UE 369 may be configured to send to the LwM2M server 340 an MO list 374 including one or more MOs representing service preference information for the UE 369.

In some demonstrative aspects, the preference information in MO list 374 may be configured to indicate a preference criterion for services to connect to the UE 369, e.g., as described above.

In some demonstrative aspects, as shown in FIG. 3, the MO list 374 may be included as part of the registration message 372, e.g., together with the client identity element 373.

In some demonstrative aspects, as shown in FIG. 3, UE 302, UE 369 and/or LwM2M server 340 may be configured to utilize the LwM2M protocol, for example, for provisioning credentials on UE 302 and/or UE 369.

In some demonstrative aspects, as shown in FIG. 3, LwM2M server 340 may utilize an LwM2M bootstrapping interface 349, for example, to provision credentials 351 to UE 302, for example, corresponding to the client identity element 323 from UE 302; and/or to provision credentials 353 to UE 369, for example, corresponding to the client identity element 373 from UE 369.

In some demonstrative aspects, for example, the LwM2M bootstrapping interface 349 may be configured to perform a role of a Key Distribution Center (KDC), for example, to provision the operational credentials 351 to UE 302 and/or to provision the operational credentials 353 to UE 369.

In some demonstrative aspects, for example, the LwM2M bootstrapping interface 349 may be configured to provision essential information into an LwM2M client, e.g., the LwM2M client implemented by UE 302 and/or the LwM2M client implemented by UE 369, for example, to enable the LwM2M client to perform a "Register" operation with LwM2M Server 340.

In some demonstrative aspects, UE 302 may transmit the register message 322 to LwM2M server 340 and/or UE 369 may transmit the register message 372 to LwM2M server 340, for example, as part of a "Register" operation, e.g., according to an LwM2M protocol.

In some demonstrative aspects, the register message 322 and/or the register message 322 may be configured to include an Endpoint Client Name parameter, e.g., along with other parameters, for example, according to the LwM2M protocol.

In some demonstrative aspects, UE 302 may be configured to set an Endpoint Client Name parameter in the register message 322 to include the client identity element 323 corresponding to UE 302.

In some demonstrative aspects, UE 369 may be configured to set an Endpoint Client Name parameter in the register message 372 to include the client identity element 373 corresponding to UE 369.

Figure 4:
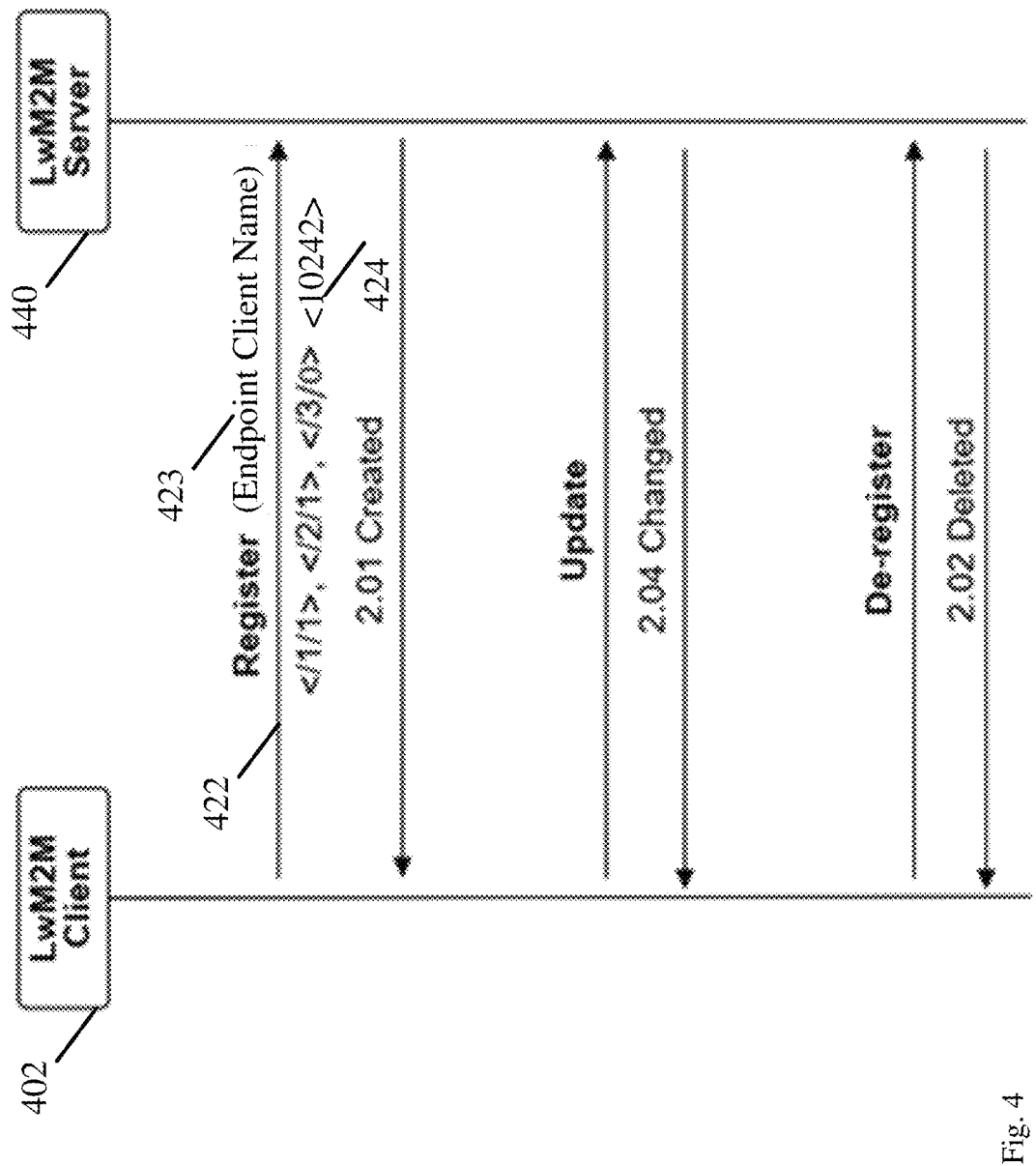
FIG. 4 is a schematic illustration of an exchange of registration messages between an LwM2M client and an LwM2M server, in accordance with some demonstrative aspects.

FIG. 4 is a schematic illustration of an exchange of registration messages between an LwM2M client 402 and an LwM2M server 440, in accordance with some demonstrative aspects.

For example, UE 302 (FIG. 3) and/or UE 369 (FIG. 3) may include, and/or be configured to perform one or more operations of, and/or functionalities of, LwM2M client 402; and/or LwM2M server 340 (FIG. 3) may include, and/or be configured to perform one or more operations of, and/or functionalities of, LwM2M server 440.

In some demonstrative aspects, as shown in FIG. 4, LwM2M client 402 may be configured to send a register message 422, for example, as part of an LwM2M register operation to register the LwM2M client 402 with LwM2M server 440.

In some demonstrative aspects, as shown in FIG. 4, the register message 422 may include a plurality of objects, for example, including a server object, e.g., with an object ID 1 (ID: 1), and a device object e.g., with an object ID 3 (ID: 3).

In some demonstrative aspects, as shown in FIG. 4, the register message 422 may include an endpoint client name parameter 423.

In some demonstrative aspects, LwM2M client 402 may be configured to configure the endpoint client name parameter 423 to include a client identity element corresponding to the LwM2M client 402. For example, the endpoint client name parameter 423 may include the client identity element of UE 302 (FIG. 3), e.g., when the register message 422 is transmitted by UE 302 (FIG. 3); and/or the endpoint client name parameter 423 may include the client identity element of UE 369 (FIG. 3), e.g., when the register message 422 is transmitted by UE 369 (FIG. 3), e.g., as described above.

In some demonstrative aspects, as shown in FIG. 4, the register message 422 may include an MO 424 including service preference information to indicate a preference criterion for services to connect to the LwM2M client 402. For example, the MO 424 may include the MO 324 (FIG. 3) of UE 302 (FIG. 3), e.g., when the register message 422 is transmitted by UE 302 (FIG. 3); and/or the MO 424 may include the MO 324 (FIG. 3) of UE 369 (FIG. 3), e.g., when the register message 422 is transmitted by UE 369 (FIG. 3), e.g., as described above.

In some demonstrative aspects, the MO 424 may be configured as a new custom MO. For example, as shown in FIG. 4, the MO 424 may be configured as a custom MO with an object OD 10242. In other aspects, the MO 424 may be configured as any other MO with another object ID.

In some demonstrative aspects, the MO 424 may include a media type item and a priority item corresponding to the media type item, e.g., as described below.

In some demonstrative aspects, the media type item may be configured to indicate a service media type, and/or the priority item may be configured to indicate a priority for a service of the service media type to connect to the LwM2M client 402.

In some demonstrative aspects, the media type item may be set to a selected media type value from a list of predefined media type values corresponding to a plurality of predefined service media types, e.g., as described below.

In some demonstrative aspects, the priority item may be set to a selected priority value from a predefined range of priority values, e.g., as described below.

In some demonstrative aspects, MO 424 may be configured to include one or more items and/or parameters, e.g., some or all of the items and/or parameters, for example, according to the following MO format:

```
<?xml version="1.0" encoding="utf-8"?>
<LWM2Mxmlns:xsi="http://www.w3.org/2001/XMLSchema-instance"
xsi:noNamespaceSchemaLocation="http://www.openmobilealliance.org/tech/profil
es/LWM2M.xsd">
    <Object ObjectType="MODefinition">
        <Name>MediaPreference</Name>
        <Description1>
        <![CDATA[This LwM2M Objects provides the Media Preference regarding
single UE. It is used when User have multiple UE's with unique identity(Unique user
ID & different device ID) & RAN decides which UE to contact first.]]>
        </Description1>
        <ObjectID>10242</ObjectID>
        <ObjectURN>urn:oma:lwm2m:x:10242:1</ObjectURN>
        <LWM2MVersion>1.0</LWM2MVersion>
        <ObjectVersion />
        <MultipleInstances>Multiple</MultipleInstances>
        <Mandatory>Optional</Mandatory>
        <Resources>
            <Item ID="1">
                <Name>MediaType</Name>
                <Operations>RW</Operations>
                <MultipleInstances>Multiple</MultipleInstances>
                <Mandatory>Mandatory</Mandatory>
                <Type>String</Type>
                <RangeEnumeration>0</RangeEnumeration>
                <Units>To Be Defined</Units>
                <Description>
                    <![CDATA
                        [Preferred Media Type for the UE
                        0 - Voice
                        1 - Video
                        2 - Games
                        3 - Chat
                        4 - Reserved
                    ]]>
                </Description>
            </Item>
            <Item ID="2">
                <Name>Priority</Name>
                <Operations>RW</Operations>
                <MultipleInstances>Multiple</MultipleInstances>
                <Mandatory>Mandatory</Mandatory>
                <Type>String</Type>
                <RangeEnumeration>3</RangeEnumeration>
                <Units>To Be Defined</Units>
                <Description>
                    <![CDATA[
                        Priority of Media Type
                        1 - High
                        255 - Low
                    ]]>
                </Description>
            </Item>
```

```
    </Resources>
    <Description2 />
  </Object>
</LWM2M>
```

In other aspects MO 424 may be configured as an Extended (Ext) MO, for example, according to the LwM2M protocol.

In one example, a "Device" MO, e.g., with Urn "urn:oma:lwm2m:oma:3" (Object ID: 3) may be used to indicate preferred Media. For example, an item in the MO, e.g., an ObjLink parameter, may be configured to include the MO details of MO 424.

In other aspects, MO 424 may be configured according to any other MO format, and/or may include one or more additional or alternative items and/or parameters.

Figure 5:
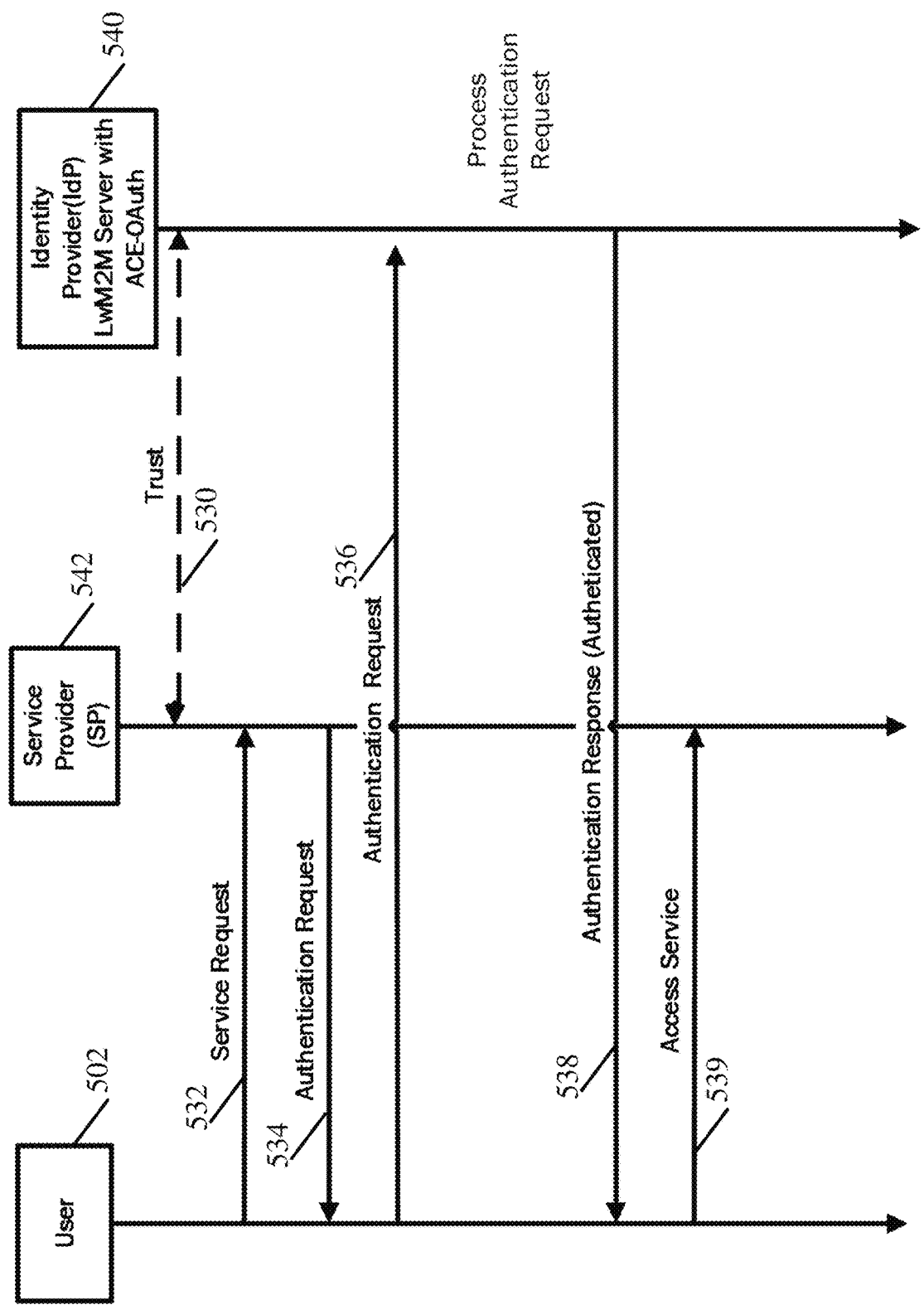
FIG. 5 is a schematic illustration of operations and communications between a UE, a service provider and a device management server according to a service access procedure, which may be implemented in accordance with some demonstrative aspects.

Reference is made to FIG. 5, which schematically illustrates operations and communications between a UE 502, a service provider 542 and a device management server 540 according to a service access procedure, which may be implemented in accordance with some demonstrative aspects.

For example, UE 102 (FIG. 1) may include, and/or be configured to perform one or more operations of, and/or functionalities of, UE 502; service provider 142 (FIG. 1) may include, and/or be configured to perform one or more operations of, and/or functionalities of, service provider 542; and/or device management server 140 (FIG. 1) may include, and/or be configured to perform one or more operations of, and/or functionalities of, device management server 540.

In some demonstrative aspects, the service access procedure of FIG. 5 may be configured to support an identity federation flow with LwM2M, for example, for a user initiated service request, e.g., as described below.

In some demonstrative aspects, UE 502 may register with device management server 540, for example, using a client identity element corresponding to UE 502. For example, the client identity element corresponding to UE 502 may a user ID based on an identity of a user of the UE 502 and a device ID based on a device identifier of the UE 502, e.g., as described above.

In some demonstrative aspects, UE 502 may receive and process credential information corresponding to the UE 502 from the device management server 540, for example as part of a registration procedure, e.g., as described above.

In some demonstrative aspects, as shown in FIG. 5, device management server 540 and service provider 542 may establish (540) an identity/trust relationship, e.g., according to any suitable identity/trust relationship procedure.

In some demonstrative aspects, as shown in FIG. 5, UE 502 may be configured to transmit a service request 532 to the service provider 542, for example, to initiate access of the UE 502 to a service of the service provider 542.

In some demonstrative aspects, the service request 532 may include the client identity element identity element corresponding to UE 502, e.g., including the user ID and the device ID.

In some demonstrative aspects, as shown in FIG. 5, UE 502 may process an authentication request received from the service provider 542, e.g., based on the service request 532.

In some demonstrative aspects, as shown in FIG. 5, UE 502 may be configured to transmit an authentication request 536 to the device management server 540, for example, to authenticate the UE 502 for accessing the service of the service provider 542.

In some demonstrative aspects, the authentication request 536 may include the credential information corresponding to the UE, e.g., as provided by the device management server 540, e.g., as part of the registration procedure.

In some demonstrative aspects, as shown in FIG. 5, UE 502 may be configured to process an authentication response 538 from the device management server 540, e.g., based on the authentication request 536. For example, as shown in FIG. 5, the authentication response 538 may include an authentication indication to indicate that the authentication of the UE 502 at the device management server 540 is successful.

In some demonstrative aspects, as shown in FIG. 5, UE 502 may be configured to access the service at service provider 542, for example, based on the authentication response 538 from the device management server 540.

Figure 6:
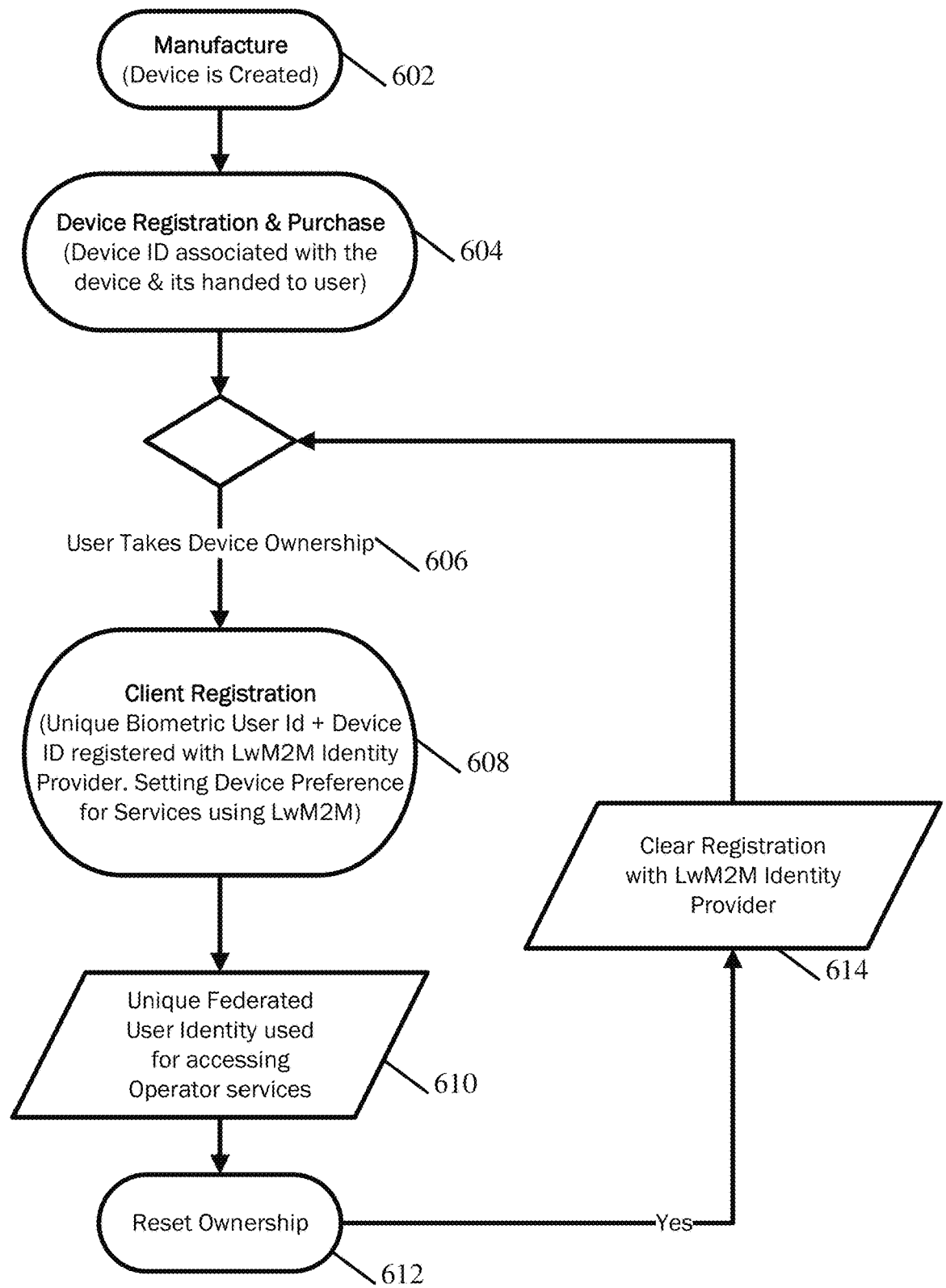
FIG. 6 is a schematic flow-chart illustration of a method of a Federated Identity Management (FIdM), in accordance with some demonstrative aspects.

Reference is made to FIG. 6, which schematically illustrates a method of FIdM, in accordance with some demonstrative aspects.

For example, the method of FIG. 6 may represent a lifecycle of a device, e.g., a UE, according to a federated unique identity solution space using LwM2M, e.g. as described below.

In some demonstrative aspects, as shown in FIG. 6, the device may be manufactured (602).

In some demonstrative aspects, as shown in FIG. 6, the device may be registered and purchase by a user (604). For example, during device registration a device ID, e.g., a unique device ID, may be assigned to the device.

In some demonstrative aspects, as shown in FIG. 6, the user may become an owner of the device (606).

In some demonstrative aspects, as shown in FIG. 6, the user may register (608) the device as a client device, for example, with an LwM2M server. For example, registration of the device may include providing to the LwM2M server the client identity element corresponding to the device, for example, including the user ID of the user and the device ID of the device, e.g., as described above.

In some demonstrative aspects, as shown in FIG. 6, the user may use the device to access (610) one or more services of one or more service providers using a unique federated user identify, for example, based on the identity element corresponding to the device, e.g., as described above.

In some demonstrative aspects, as shown in FIG. 6, at some point in time, the device may potentially change ownership (612) to a new user.

In some demonstrative aspects, as shown in FIG. 6, the registration of the device with the LwM2M server may be cleared and/or reset (614), for example, based on the change of ownership.

In some demonstrative aspects, as shown in FIG. 6, the new user may take ownership of the device (606) and may register (608) the device as a client device, for example, with the LwM2M server. For example, registration of the device may include providing to the LwM2M server the client identity element corresponding to the device, for example, including the user ID of the new user and the device ID of the device, e.g., as described above.

Figure 7:
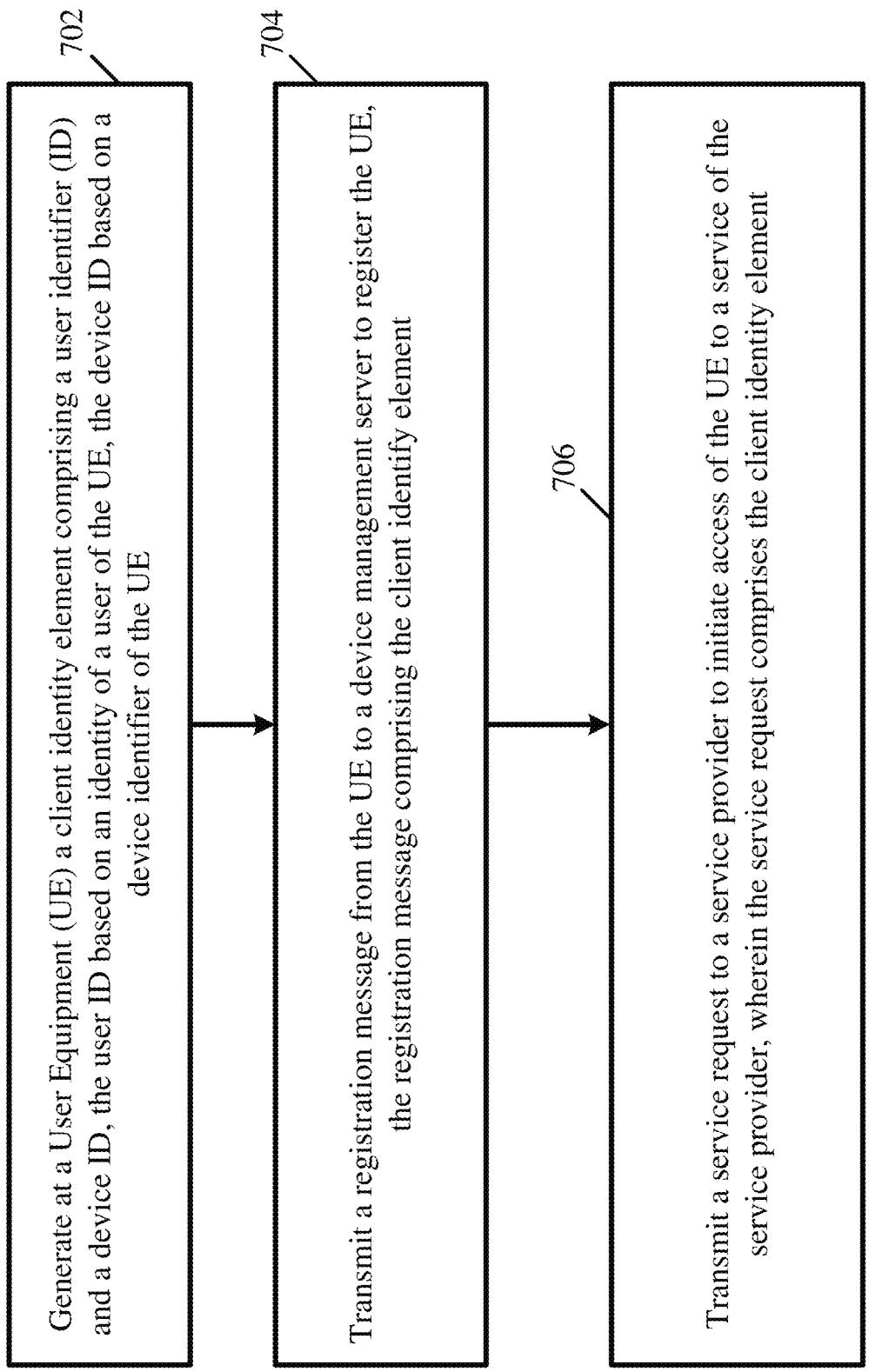
FIG. 7 is a schematic flow-chart illustration of a method of using a client identity for UE service access, in accordance with some demonstrative aspects.

FIG. 7 is a schematic flow-chart illustration of a method of using a client identify for UE service access, in accordance with some demonstrative aspects. For example, one or more of the operations of the method of FIG. 7 may be performed by one or more elements of a system, e.g., system 100 (FIG. 1), for example, a UE, e.g., UE 102 (FIG. 1) and/or UE 169 (FIG. 1), and/or a controller, e.g., controller 124 (FIG. 1).

As indicated at block 702, the method may include generate at a UE a client identity element including a user ID and a device ID, the user ID based on an identity of a user of the UE, the device ID based on a device identifier of the UE. For example, controller 124 (FIG. 1) may be configured generate the client identity element including the user ID for a user of the UE 102 (FIG. 1) an the device ID for UE 102 (FIG. 1), e.g., as described above.

As indicated at block 704, the method may include transmitting a registration message from the UE to a device management server to register the UE, the registration message including the client identity element. For example, controller 124 (FIG. 1) may be configured to cause UE 102 (FIG. 1) to transmit the registration message to device management server 140 (FIG. 1), e.g., as described above.

As indicated at block 706, the method may include transmitting a service request from the UE to a service provider to initiate access of the UE to a service of the service provider, wherein the service request includes the client identity element. For example, controller 124 (FIG. 1) may be configured to cause UE 102 (FIG. 1) to transmit the service request to service provider 142 (FIG. 1), e.g., as described above.

Figure 8:
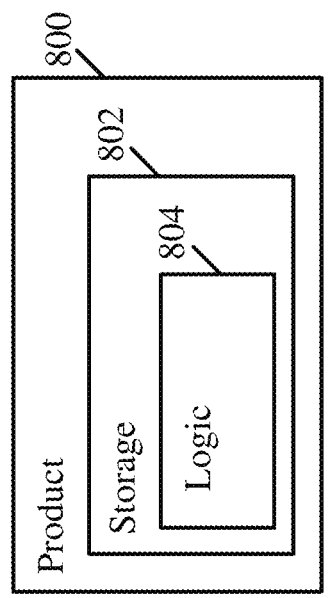
FIG. 8 is a schematic illustration of a product of manufacture, in accordance with some demonstrative aspects.

Reference is made to FIG. 8, which schematically illustrates a product of manufacture 800, in accordance with some demonstrative aspects. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at UE 102 (FIG. 1), UE 169 (FIG. 1), controller 124 (FIG. 1), and/or message processor 128 (FIG. 1), to cause UE 102 (FIG. 1), UE 169 (FIG. 1), controller 124 (FIG. 1), and/or message processor 128 (FIG. 1), to perform, trigger and/or implement one or more operations and/or functionalities, and/or to perform, trigger and/or implement one or more operations and/or functionalities described with reference to the FIGS. 1-7, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 800 and/or machine-readable storage media 802 may include one or more types of computer-readable storage media capable of storing data, including volatile memory, non-volatile memory, removable or non-removable memory, erasable or non-erasable memory, writeable or re-writeable memory, and the like. For example, machine-readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a User Equipment (UE) to generate a client identity element comprising a user identifier (ID) and a device ID, the user ID based on an identity of a user of the UE, the device ID based on a device identifier of the UE; transmit a registration message from the UE to a device management server to register the UE, the registration message comprising the client identity element; and transmit a service request to a service provider to initiate access of the UE to a service of the service provider, wherein the service request comprises the client identity element.

Example 2 includes the subject matter of Example 1, and optionally, wherein the registration request comprises a Management Object (MO) comprising service preference information to indicate a preference criterion for services to connect to the UE.

Example 3 includes the subject matter of Example 2, and optionally, wherein the apparatus is configured to cause the UE to set in the MO a media type item and a priority item corresponding to the media type item, wherein the media type item is to indicate a service media type, the priority item to indicate a priority for a service of the service media type to connect to the UE.

Example 4 includes the subject matter of Example 3, and optionally, wherein the apparatus is configured to cause the UE to set the media type item to a selected media type value from a list of predefined media type values corresponding to a plurality of predefined service media types, and to set the priority item to a selected priority value from a predefined range of priority values.

Example 5 includes the subject matter of Example 3 or 4, and optionally, wherein the apparatus is configured to cause the UE to set an object ID in the MO to 10242.

Example 6 includes the subject matter of Example 3 or 4, and optionally, wherein the apparatus is configured to cause the UE to set an External-device-info item in the registration message to direct to the MO.

Example 7 includes the subject matter of any one of Examples 2-6, and optionally, wherein the apparatus is configured to cause the UE to set the preference information based on information from the user of the UE.

Example 8 includes the subject matter of any one of Examples 2-7, and optionally, wherein the apparatus is configured to cause the UE to process traffic received from one or more service providers according to the preference criterion.

Example 9 includes the subject matter of any one of Examples 1-8, and optionally, wherein the apparatus is configured to cause the UE to set an Endpoint Client Name parameter comprising the client identity element in the registration message.

Example 10 includes the subject matter of any one of Examples 1-9, and optionally, wherein the device management server comprises a Light-Weight Machine-to-Machine (LwM2M) server, wherein the registration message comprises a registration request according to an LwM2M protocol.

Example 11 includes the subject matter of Example 10, and optionally, wherein the apparatus is configured to cause the UE to establish access to the service based on an exchange of messages with the device management server and with the service provider, the exchange of messages according to a Federated Identity Management (FIdM) procedure using the LwM2M server as an identify provider server.

Example 12 includes the subject matter of any one of Examples 1-11, and optionally, wherein the user ID is based on a unique identifier of the user.

Example 13 includes the subject matter of any one of Examples 1-12, and optionally, wherein the user ID is based on biometric information of the user.

Example 14 includes the subject matter of any one of Examples 1-13, and optionally, wherein the user ID is based on government-issued ID information of the user.

Example 15 includes the subject matter of any one of Examples 1-14, and optionally, wherein the device ID is based on an International Mobile Equipment Identity (IMEI) of the UE.

Example 16 includes the subject matter of any one of Examples 1-15, and optionally, wherein the apparatus is configured to cause the UE to establish access to the service based on an exchange of messages with the device management server and with the service provider according to a Federated Identity Management (FIdM) procedure.

Example 17 includes the subject matter of any one of Examples 1-16, and optionally, wherein the apparatus is configured cause the UE to process credential information corresponding to the UE from the device management server; and based on an authentication request from the service provider, transmit an authentication request to the device management server to authenticate the UE for accessing the service of the service provider, wherein the authentication request comprises the credential information corresponding to the UE.

Example 18 includes the subject matter of any one of Examples 1-17, and optionally, comprising a radio to transmit the registration message and the service request.

Example 19 includes the subject matter of Example 18, and optionally, comprising one or more antennas connected to the radio, a processor to execute instructions of an operating system of the UE, and a memory to store information processed by the processor.

Example 20 comprises a wireless communication device comprising the apparatus of any one of Examples 1-19.

Example 21 comprises an apparatus comprising means for executing any of the described operations of Examples 1-19.

Example 22 comprises a product comprising one or more tangible computer-readable non-transitory storage media comprising computer-executable instructions operable to, when executed by at least one processor, enable the at least one processor to cause a device to perform any of the described operations of Examples 1-19.

Example 23 comprises an apparatus comprising: a memory interface; and processing circuitry configured to: perform any of the described operations of Examples 1-19.

Example 24 comprises a method comprising any of the described operations of Examples 1-19.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a User Equipment (UE) to:
generate a client identity element comprising a user identifier (ID) and a device ID, the user ID based on an identity of a user of the UE, the device ID based on a device identifier of the UE;
transmit a registration message from the UE to a device management server to register the UE, the registration message comprising the client identity element; and
transmit a service request to a service provider to initiate access of the UE to a service of the service provider, wherein the service request comprises the client identity element.

2. The apparatus of claim 1, wherein the registration message comprises a Management Object (MO) comprising service preference information to indicate a preference criterion for services to connect to the UE.

3. The apparatus of claim 2 configured to cause the UE to set in the MO a media type item and a priority item corresponding to the media type item, wherein the media type item is to indicate a service media type, the priority item to indicate a priority for a service of the service media type to connect to the UE.

4. The apparatus of claim 3 configured to cause the UE to set the media type item to a selected media type value from a list of predefined media type values corresponding to a plurality of predefined service media types, and to set the priority item to a selected priority value from a predefined range of priority values.

5. The apparatus of claim 3 configured to cause the UE to set an object ID in the MO to 10242.

6. The apparatus of claim 3 configured to cause the UE to set an External-device-info item in the registration message to direct to the MO.

7. The apparatus of claim 2 configured to cause the UE to set the preference information based on information from the user of the UE.

8. The apparatus of claim 2 configured to cause the UE to process traffic received from one or more service providers according to the preference criterion.

9. The apparatus of claim 1 configured to cause the UE to set an Endpoint Client Name parameter comprising the client identity element in the registration message.

10. The apparatus of claim 1, wherein the device management server comprises a Light-Weight Machine-to-Machine (LwM2M) server, wherein the registration message comprises a registration request according to an LwM2M protocol.

11. The apparatus of claim 10 configured to cause the UE to establish access to the service based on an exchange of messages with the device management server and with the service provider, the exchange of messages according to a Federated Identity Management (FIdM) procedure using the LwM2M server as an identify provider server.

12. The apparatus of claim 1, wherein the user ID is based on a unique identifier of the user.

13. The apparatus of claim 1, wherein the user ID is based on biometric information of the user.

14. The apparatus of claim 1, wherein the user ID is based on government-issued ID information of the user.

15. The apparatus of claim 1, wherein the device ID is based on an International Mobile Equipment Identity (IMEI) of the UE.

16. The apparatus of claim 1 configured to cause the UE to establish access to the service based on an exchange of messages with the device management server and with the service provider according to a Federated Identity Management (FIdM) procedure.

17. The apparatus of claim 1 configured cause the UE to:
process credential information corresponding to the UE from the device management server; and
based on an authentication request from the service provider, transmit an authentication request to the device management server to authenticate the UE for accessing the service of the service provider, wherein the authentication request to the device management server comprises the credential information corresponding to the UE.

18. The apparatus of claim 1 comprising a radio to transmit the registration message and the service request.

19. The apparatus of claim 18 comprising one or more antennas connected to the radio, a processor to execute instructions of an operating system of the UE, and a memory to store information processed by the processor.

20. A product comprising one or more tangible computer-readable non-transitory storage media comprising computer-executable instructions operable to, when executed by at least one processor, enable the at least one processor to cause a User Equipment (UE) to:
generate a client identity element comprising a user identifier (ID) and a device ID, the user ID based on an identity of a user of the UE, the device ID based on a device identifier of the UE;
transmit a registration message from the UE to a device management server to register the UE, the registration message comprising the client identity element; and
transmit a service request to a service provider to initiate access of the UE to a service of the service provider, wherein the service request comprises the client identity element.

21. The product of claim 20, wherein the registration message comprises a Management Object (MO) comprising service preference information to indicate a preference criterion for services to connect to the UE.

22. The product of claim 21, wherein the instructions, when executed, cause the UE to set in the MO a media type item and a priority item corresponding to the media type item, wherein the media type item is to indicate a service media type, the priority item to indicate a priority for a service of the service media type to connect to the UE.

23. The product of claim 20, wherein the device management server comprises a Light-Weight Machine-to-Machine (LwM2M) server, wherein the registration message comprises a registration request according to an LwM2M protocol.

24. An apparatus for a User Equipment (UE), the apparatus comprising:
means for generating a client identity element comprising a user identifier (ID) and a device ID, the user ID based on an identity of a user of the UE, the device ID based on a device identifier of the UE;
means for causing the UE to transmit a registration message from the UE to a device management server to register the UE, the registration message comprising the client identity element; and
means for causing the UE to transmit a service request to a service provider to initiate access of the UE to a service of the service provider, wherein the service request comprises the client identity element.

25. The apparatus of claim 24, wherein the registration message comprises a Management Object (MO) comprising service preference information to indicate a preference criterion for services to connect to the UE.

* * * * *